(12) United States Patent
Ishido

(10) Patent No.: US 10,895,830 B2
(45) Date of Patent: Jan. 19, 2021

(54) BELT DRIVE DEVICE CAPABLE OF RESTRICTING DAMAGE OF BELT, IMAGE FORMING APPARATUS

(71) Applicant: KYOCERA Document Solutions Inc., Osaka (JP)

(72) Inventor: Kohei Ishido, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/736,293

(22) Filed: Jan. 7, 2020

(65) Prior Publication Data

US 2020/0218177 A1    Jul. 9, 2020

(30) Foreign Application Priority Data

Jan. 8, 2019   (JP) .................................. 2019-001216

(51) Int. Cl.
| | |
|---|---|
| *G03G 15/16* | (2006.01) |
| *F16H 7/02* | (2006.01) |
| *F16H 7/12* | (2006.01) |
| *F16H 55/36* | (2006.01) |

(52) U.S. Cl.
CPC ........... *G03G 15/1615* (2013.01); *F16H 7/02* (2013.01); *F16H 7/12* (2013.01); *F16H 55/36* (2013.01); *F16H 2055/363* (2013.01)

(58) Field of Classification Search
CPC ............... G03G 15/1615; F16H 55/36; F16H 2055/363
See application file for complete search history.

(56) References Cited

U.S. PATENT DOCUMENTS

| | | | | |
|---|---|---|---|---|
| 3,387,758 A | * | 6/1968 | Delany | G11B 15/60 226/108 |
| 5,411,444 A | * | 5/1995 | Nakamura | F16H 7/02 474/148 |
| 7,856,195 B2 | * | 12/2010 | Seto | G03G 15/757 399/167 |
| 9,075,375 B2 | * | 7/2015 | Tsuji | G03G 15/55 |
| 9,222,572 B2 | * | 12/2015 | Yamaguchi | F16H 57/0489 |
| 9,285,752 B2 | * | 3/2016 | Okuno | G03G 15/757 |

(Continued)

FOREIGN PATENT DOCUMENTS

| | | |
|---|---|---|
| EP | 0603776 A1 | 6/1994 |
| JP | 2001080780 A * | 3/2001 |

(Continued)

OTHER PUBLICATIONS

European Patent Office, Office Action Issued in Application No. 19217108.0, dated Jun. 22, 2020, Germany, 8 pages.

*Primary Examiner* — Walter L Lindsay, Jr.
*Assistant Examiner* — Milton Gonzalez
(74) *Attorney, Agent, or Firm* — Alleman Hall Creasman & Tuttle LLP

(57) ABSTRACT

A belt drive device includes a first pulley, a second pulley, a first bulging portion, a belt, and a pressing portion. The first bulging portion is formed along an outer periphery of the second pulley to bulge outward in a radial direction of the second pulley at a center of the second pulley in an axial direction of the second pulley. The belt is stretched between the first pulley and the first bulging portion. The pressing portion presses an outer peripheral surface of the belt at a center of the belt in a width direction of the belt.

5 Claims, 5 Drawing Sheets

(56) References Cited

U.S. PATENT DOCUMENTS

| | | |
|---|---|---|
| 9,334,931 B2 * | 5/2016 | Yamaguchi ............... F16H 7/02 |
| 2014/0064752 A1 | 3/2014 | Tsuji et al. |
| 2014/0235392 A1 | 8/2014 | Yamaguchi et al. |
| 2015/0043942 A1 | 2/2015 | Okuno et al. |

FOREIGN PATENT DOCUMENTS

| | | |
|---|---|---|
| JP | 2011125892 A | 6/2011 |
| JP | 2014159866 A | 9/2014 |

* cited by examiner

BELT DRIVE DEVICE CAPABLE OF RESTRICTING DAMAGE OF BELT, IMAGE FORMING APPARATUS

INCORPORATION BY REFERENCE

This application is based upon and claims the benefit of priority from the corresponding Japanese Patent Application No. 2019-001216 filed on Jan. 8, 2019, the entire contents of which are incorporated herein by reference.

BACKGROUND

The present disclosure relates to a belt drive device and an image forming apparatus.

There is known a belt drive mechanism in which a metal belt is stretched between a drive pulley and a driven pulley, and a bulging portion is formed on an outer peripheral surface of the driven pulley, the bulging portion being bulged outward in the radial direction of the driven pulley.

SUMMARY

A belt drive device according to an aspect of the present disclosure includes a first pulley, a second pulley, a first bulging portion, a belt, and a pressing portion. The first bulging portion is formed along an outer periphery of the second pulley to bulge outward in a radial direction of the second pulley at a center of the second pulley in an axial direction of the second pulley. The belt is stretched between the first pulley and the first bulging portion. The pressing portion presses an outer peripheral surface of the belt at a center of the belt in a width direction of the belt.

An image forming apparatus according to another aspect of the present disclosure includes the belt drive device and an image forming portion. The image forming portion includes a driven body driven by the belt drive device, and forms an image on a sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 1]

Figure 1:
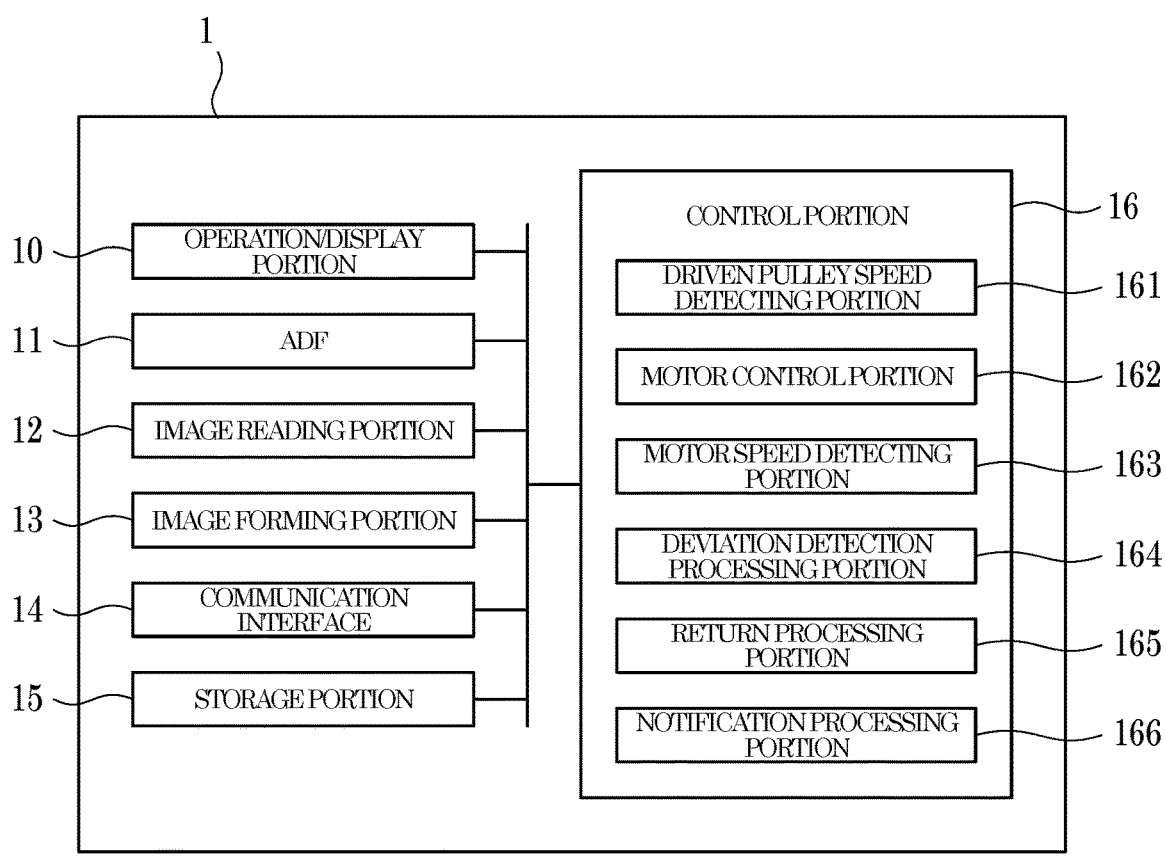
FIG. 1 is a block diagram showing a system configuration of an image forming apparatus according to an embodiment of the present disclosure.

As shown in FIG. 1, an image forming apparatus 1 of the present embodiment includes an operation/display portion 10, an ADF (Auto Document Feeder) 11, an image reading portion 12, an image forming portion 13, a communication interface 14, a storage portion 15, and a control portion 16. Specifically, the image forming apparatus 1 is a multifunction peripheral having a plurality of functions such as a printer function, a scanner function, a copy function, and a facsimile function. The image forming apparatus 1 is an example of a belt drive device of the present disclosure. It is noted that the present disclosure is not limited to a multifunction peripheral, but is applicable to image forming apparatuses such as a copier, a printer, and a facsimile device. In addition, the present disclosure is not limited to an image forming apparatus, but is applicable to a belt drive device that includes a belt drive mechanism such as a belt drive portion 20 described below.

The operation/display portion 10 includes a display portion and an operation portion, wherein the display portion is, for example, a liquid crystal display and displays information, and the operation portion is, for example, operation buttons or a touch panel for receiving user operations.

The ADF 11 is an automatic document sheet feeding device that includes a document sheet setting portion, a conveyance roller, a document sheet pressing, and a sheet discharge portion, and conveys a document sheet so that it is read by the image reading portion 12.

The image reading portion 12 includes a document sheet table, a light source, a mirror, an optical lens, and a CCD (Charge Coupled Device), and is configured to read an image from a document sheet and output the read image as image data.

The image forming portion 13 is configured to execute a print process based on image data by an electrophotographic method or an inkjet method, and forms an image on a sheet based on the image data. For example, in a case where the image forming portion 13 is configured to form an image on a sheet by the electrophotographic method, the image forming portion 13 includes a photoconductor drum, a charger, an exposure device, a developing device, a transfer device, and a fixing device. The photoconductor drum is an example of a driven body 30 (see FIG. 2) described below.

The communication interface 14 is configured to execute a communication process in accordance with a predetermined communication protocol with an external information processing apparatus such as a facsimile apparatus or a personal computer via a communication network such as a telephone line, the Internet, or a LAN.

The storage portion 15 is a nonvolatile storage device such as a hard disk or an EEPROM. The storage portion 15 stores various control programs executed by the control portion 16, and various types of data.

The control portion 16 includes control equipment such as a CPU, a ROM, and a RAM. The CPU is a processor that executes various calculation processes. The ROM is a nonvolatile storage device in which various information such as control programs for causing the CPU to execute various processes are preliminarily stored. The RAM is a volatile or nonvolatile storage device that is used as a temporary storage memory (working area) for the various processes executed by the CPU.

[Configuration of Belt Drive Portion 20]

Figure 2:
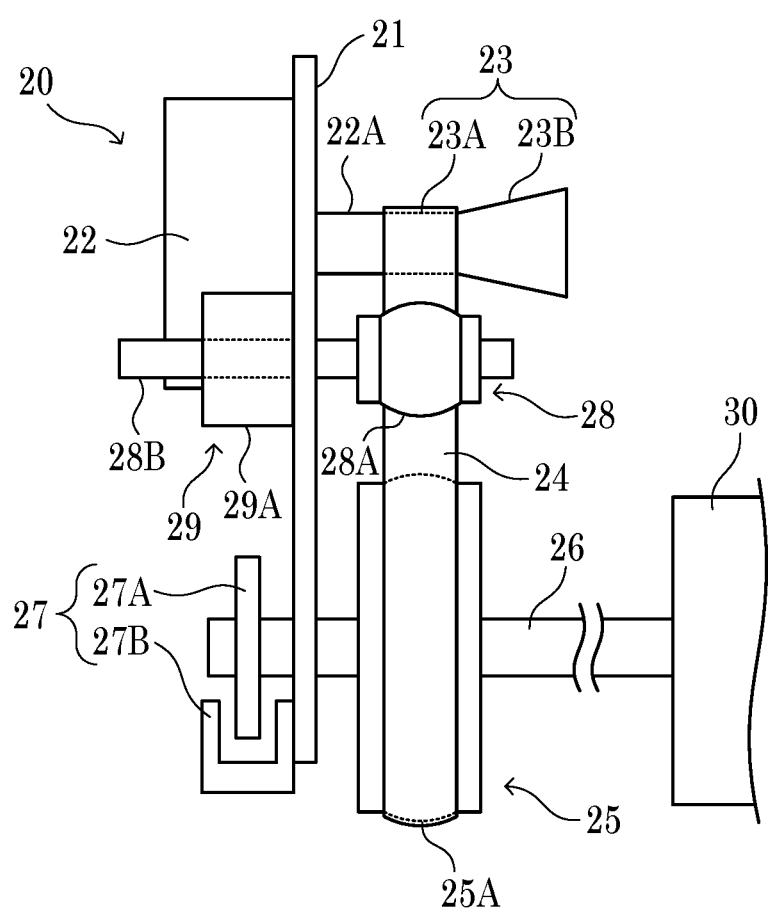
FIG. 2 is a diagram showing an example configuration of a belt drive portion of the image forming apparatus according to the embodiment of the present disclosure.
Figure 3:
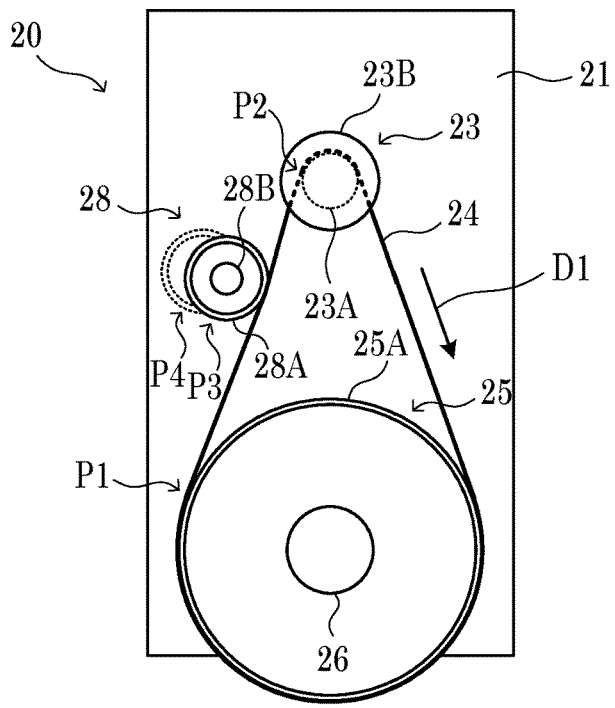
FIG. 3 is a diagram showing an example configuration of the belt drive portion of the image forming apparatus according to the embodiment of the present disclosure.

The image forming apparatus 1 includes the belt drive portion 20 that is shown in FIG. 2 and FIG. 3. It is noted that FIG. 3 shows the belt drive portion 20 shown in FIG. 2 viewed from the right side of FIG. 2. The belt drive portion 20 is a mechanism configured to transmit a rotational driving force of a motor 22 to the driven body 30 such as the photoconductor drum.

The belt drive portion 20 includes a support portion 21, the motor 22, a drive pulley 23, a metal belt 24, a driven pulley 25, an output shaft 26, a rotary encoder 27, a pressing pulley 28, and a moving mechanism 29. The rotary encoder 27 includes a pulse plate 27A having a shape of a circular plate, and a photo sensor 27B.

The motor 22 and the photo sensor 27B are fixed to the support portion 21. In addition, the support portion 21 supports a rotation shaft 22A of the motor 22, the output shaft 26, and the pressing pulley 28 in a rotatable manner. In addition, the support portion 21 supports a bearing portion 29A of the moving mechanism 29.

The motor 22 is driven by a motor drive circuit (not shown). The drive pulley 23 is coupled with the rotation shaft 22A of the motor 22, and is rotated by the motor 22. The drive pulley 23 is an example of a first pulley of the present disclosure. It is noted that the first pulley of the present disclosure may be a drive roller coupled with the rotation shaft 22A of the motor 22.

The metal belt 24 is stretched between the drive pulley 23 and the driven pulley 25, and transmits the rotation of the drive pulley 23 to the driven pulley 25. The metal belt 24 is, for example, an endless belt made of stainless steel. With the rotation of the drive pulley 23, the metal belt 24 moves circularly in a moving direction D1 shown in FIG. 3.

The driven pulley 25 is fixed to the output shaft 26, and integrally rotates with the output shaft 26. The driven pulley 25 is an example of a second pulley of the present disclosure. The pulse plate 27A is fixed to one end (the left end in FIG. 2) of the output shaft 26, and the driven body 30 such as the photoconductor drum is coupled with the other end of the output shaft 26. With this configuration, the rotational driving force of the motor 22 is transmitted to the driven body 30 via the drive pulley 23, the metal belt 24, the driven pulley 25, and the output shaft 26. This allows the driven body 30 to be driven by the rotational driving force of the motor 22.

The rotary encoder 27 outputs a pulse signal at a rate corresponding to a rotation speed of the driven pulley 25. Specifically, on the pulse plate 27A of the rotary encoder 27, a plurality of slits are formed at equal intervals along a peripheral direction. On the other hand, in the photo sensor 27B of the rotary encoder 27, a light emitting portion and a light receiving portion are disposed to face each other across the pulse plate 27A. With the rotation of the pulse plate 27A, a state where light emitted from the light emitting portion enters the light receiving portion via a slit, and a state where light emitted from the light emitting portion is blocked by the pulse plate 27A, are repeated. As a result, an amount of light that enters the light receiving portion changes periodically, and the pulse signal is output from the rotary encoder 27 at a rate corresponding to the rotation speed of the driven pulley 25. The pulse signals are input to the control portion 16.

Meanwhile, there is known a technique for restricting a deviation (meandering) of a belt. According to the technique, the belt is stretched on a pulley that has a bulging portion of what is called a crown shape, namely the pulley is formed to bulge at a center thereof in an axial direction thereof. In a case where this technique is adopted to restrict the deviation of the metal belt 24, the bulging portion may be provided on either the drive pulley 23 or the driven pulley 25 (for example, on the driven pulley 25). However, this may cause the metal belt 24 to be plastically deformed and curved along the bulging portion of the driven pulley 25. In that case, when the curved metal belt 24 comes in contact with the drive pulley 23, a force that acts on opposite ends of the metal belt 24 in the width direction is larger than a force that acts on the center of the metal belt 24 in the width direction. This may damage the opposite ends of the metal belt 24 in the width direction. On the other hand, as described in the following, the image forming apparatus 1 of the present embodiment is configured to restrict the metal belt 24 from being damaged.

Figure 4:
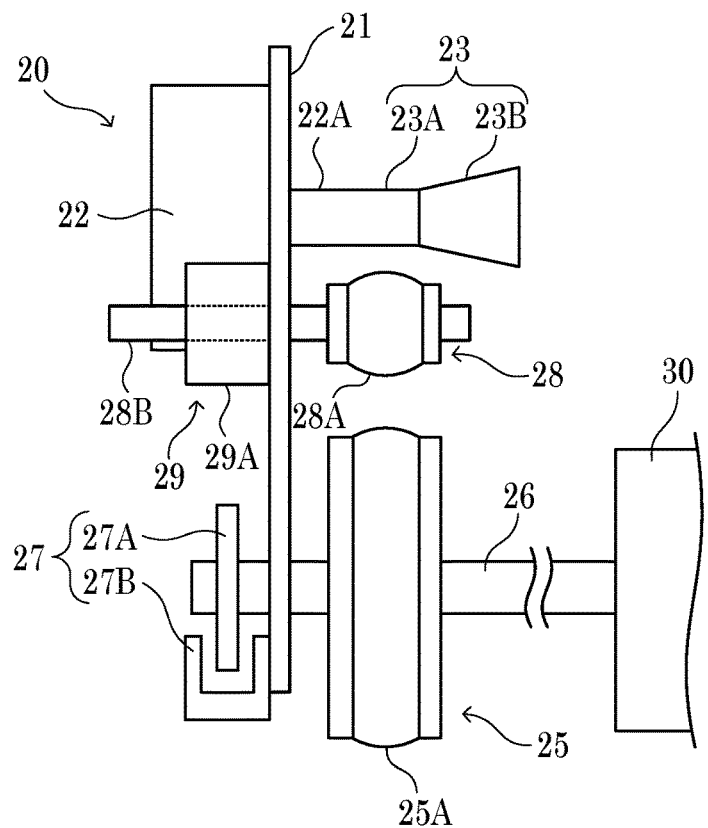
FIG. 4 is a diagram showing an example configuration of the belt drive portion of the image forming apparatus according to the embodiment of the present disclosure.

FIG. 4 shows the belt drive portion 20 in a state where the metal belt 24 is removed. In the present embodiment, the bulging portion is formed on the driven pulley 25. That is, as shown in FIG. 4, a first bulging portion 25A of what is called the crown shape is formed on the driven pulley 25, the first bulging portion 25A being formed to bulge at a center of the driven pulley 25 in an axial direction thereof. The first bulging portion 25A is formed on and along the entire outer periphery of the driven pulley 25, and bulges outward in the radial direction of the driven pulley 25. In other words, the first bulging portion 25A forms a curved surface of the outer periphery of the driven pulley 25 that continues along the outer periphery of the driven pulley 25 and is curved outward in the radial direction.

The metal belt 24 is stretched between a first outer periphery portion 23A and the first bulging portion 25A, wherein the first outer periphery portion 23A is a cylindrical portion of the drive pulley 23. This restricts the deviation of the metal belt 24.

It is noted that as another embodiment, the bulging portion may be formed on the first outer periphery portion 23A of the drive pulley 23. In addition, the first bulging portion 25A may be intermittently formed along the outer periphery of the driven pulley 25.

The pressing pulley 28 is provided in a state of being in contact with the outer peripheral surface of the metal belt 24, and rotates following the movement of the metal belt 24. The pressing pulley 28 is an example of a third pulley of the present disclosure. As shown in FIG. 3, the pressing pulley 28 is in contact with the metal belt 24 at a position that is on the downstream side of a first position P1 in the moving direction D1 of the metal belt 24, and is on the upstream side of a second position P2 in the moving direction D1, wherein an arbitrary point on the moving metal belt 24 starts to be separated from the driven pulley 25 at the first position P1, and an arbitrary point on the moving metal belt 24 starts to contact with the drive pulley 23 at the second position P2.

As shown in FIG. 4, a second bulging portion 28A of what is called the crown shape is formed on the pressing pulley 28, the second bulging portion 28A being formed to bulge at a center of the pressing pulley 28 in an axial direction thereof. The second bulging portion 28A is an example of a pressing portion of the present disclosure. The second bulging portion 28A is formed on and along the entire outer periphery of the pressing pulley 28, and is formed to bulge outward in the radial direction of the pressing pulley 28. In other words, the second bulging portion 28A forms a curved surface of the outer periphery of the pressing pulley 28 that continues along the outer periphery of the pressing pulley 28 and is curved outward in the radial direction. The second bulging portion 28A is formed such that the curvature thereof in the axial direction of the pressing pulley 28 is larger than the curvature of the first bulging portion 25A in the axial direction of the driven pulley 25.

The outer peripheral surface of the metal belt 24 is pressed at its center in the width direction by the second bulging portion 28A. On the other hand, the inner peripheral surface of the metal belt 24 is pressed at its center in the width direction by the first bulging portion 25A. In other words, the metal belt 24 receives a force from the second bulging portion 28A in a reverse direction to a direction in which it receives a force from the first bulging portion 25A. This reduces or removes the effect that is caused to the metal belt 24 by the force received from the first bulging portion 25A. As a result, a plastic deformation of the metal belt 24 by the force received from the first bulging portion 25A is restricted.

Meanwhile, in a case where the metal belt 24 is short in peripheral length and is high in rigidity, an elastic deformation that is caused to the metal belt 24 by the force received from the first bulging portion 25A may occur on the drive pulley 23 side, too. That is, the metal belt 24 may be curved on the drive pulley 23 side, too. On the other hand, in the image forming apparatus 1, as shown in FIG. 3, the second bulging portion 28A presses the metal belt 24 at a position that is on the downstream side of the first position P1 in the moving direction D1 of the metal belt 24, and is on the upstream side of the second position P2 in the moving direction D1. In addition, in the image forming apparatus 1, the curvature of the surface of second bulging portion 28A is larger than the curvature of the surface of the first bulging portion 25A. With this configuration, the elastic deformation that is caused to the metal belt 24 by the force received from the first bulging portion 25A is removed by the second bulging portion 28A before the metal belt 24 comes in contact with the drive pulley 23. This prevents the metal belt 24 in a curved state from coming in contact with the drive pulley 23.

As another embodiment, the second bulging portion 28A may press the metal belt 24 at a position that is on the upstream side of the first position P1 in the moving direction D1 of the metal belt 24, and is on the downstream side of the second position P2 in the moving direction D1. In addition, as another embodiment, the second bulging portion 28A may be formed intermittently along the outer periphery of the pressing pulley 28. Furthermore, as another embodiment, the second bulging portion 28A may be formed such that the curvature thereof in the axial direction of the pressing pulley 28 is equal to or smaller than the curvature of the first bulging portion 25A in the axial direction of the driven pulley 25. Furthermore, as another embodiment, the pressing pulley 28 may not include the second bulging portion 28A. In addition, as another embodiment, instead of the pressing pulley 28, for example, a bar-shaped contact member that has a spherical surface at its tip in an extension direction may be provided in a state of being in contact with the outer peripheral surface of the metal belt 24 such that the tip presses the central portion of the metal belt 24 in the width direction.

The moving mechanism 29 is configured to move the pressing pulley 28 between a third position P3 (see FIG. 3) and a fourth position P4, wherein the pressing pulley 28 is in contact with the metal belt 24 when the pressing pulley 28 is at the third position P3, and the pressing pulley 28 is separated from the metal belt 24 when the pressing pulley 28 is at the fourth position P4. It is noted that in FIG. 3, the pressing pulley 28 located at the fourth position P4 is indicated by the dotted line.

The moving mechanism 29 includes the bearing portion 29A and a drive portion (not shown). The bearing portion 29A supports a rotation shaft 28B of the pressing pulley 28 in a rotatable manner. The pressing pulley 28 and the bearing portion 29A are supported in such a way as to move between the third position P3 and the fourth position P4. The drive portion includes a motor or a solenoid, and moves the bearing portion 29A between the third position P3 and the fourth position P4. The drive portion moves the bearing portion 29A between the third position P3 and the fourth position P4 in response to a control signal input from the control portion 16.

It is noted that it is difficult to prevent the deviation of the metal belt 24 completely, and even if the above-described configuration is adopted, the metal belt 24 may be deviated. In view of this, the image forming apparatus 1 of the present embodiment has a function to detect a deviation of the metal belt 24, and return the metal belt 24 to its original position as necessary.

Specifically, as shown in FIG. 1, the control portion 16 includes a driven pulley speed detecting portion 161, a motor control portion 162, a motor speed detecting portion 163, a deviation detection processing portion 164, a return processing portion 165, and a notification processing portion 166. It is noted that the control portion 16 functions as these processing portions by executing various processes in accordance with the control programs. In addition, the control portion 16 may include an electronic circuit that realizes one or more processing functions of these processing portions.

The driven pulley speed detecting portion 161 detects a rotation speed of the driven pulley 25. Specifically, the driven pulley speed detecting portion 161 detects the rotation speed of the driven pulley 25 based on the pulse signal output from the rotary encoder 27.

The motor control portion 162 feedback-controls the rotation speed of the motor 22 based on the rotation speed of the driven pulley 25 detected by the driven pulley speed detecting portion 161 so that the rotation speed of the driven pulley 25 becomes a predetermined target speed. The motor control portion 162 controls the rotation speed of the motor 22 via the motor drive circuit (not shown).

The motor speed detecting portion 163 detects the rotation speed of the motor 22. For example, the motor speed detecting portion 163 detects the rotation speed of the motor 22 based on, for example: a size of current supplied from the motor drive circuit (not shown) to the motor 22; and an output signal from a sensor (for example, a rotary encoder or a hall sensor) that is provided for detection of the rotation speed of the motor 22.

The deviation detection processing portion 164 detects a deviation of the metal belt 24 with respect to the first outer periphery portion 23A of the drive pulley 23 or the first bulging portion 25A based on the rotation speed of the motor 22 detected by the motor speed detecting portion 163. The following describes a detection method by which the deviation detection processing portion 164 detects a deviation of the metal belt 24.

The tensile strength of the metal belt 24 causes a force toward the driven pulley 25 to act on the drive pulley 23. This allows the drive pulley 23 to be bent, and a tip end portion (a right end portion in FIG. 2) of the drive pulley 23 moves toward the driven pulley 25. As a result of this, the metal belt 24 is apt to be deviated toward the tip portion of the drive pulley 23 from the first outer periphery portion 23A of the drive pulley 23. When the metal belt 24 is deviated toward the tip portion of the drive pulley 23, and finally removed from the drive pulley 23, it becomes impossible for the image forming portion 13 to form an image.

In the present embodiment, as shown in FIG. 4, a second outer periphery portion 23B is formed on the drive pulley 23 so that the above-described deviation of the metal belt 24 can be detected. The second outer periphery portion 23B is formed in a reversely tapered shape, and the diameter of the second outer periphery portion 23B becomes large as the position in the axial direction goes away from the first outer periphery portion 23A. Accordingly, as the metal belt 24 is deviated toward the tip portion of the drive pulley 23, the diameter of the drive pulley 23 contacting the metal belt 24 becomes large. As a result, the peripheral speed of the drive pulley 23 at the position where it is in contact with the metal belt 24 increases, and together with this, the moving speed (circulation speed) of the metal belt 24 increases.

When the moving speed of the metal belt 24 increases, the rotation speed of the driven pulley 25 increases, as well. Thus, in that case, the motor control portion 162 decreases the rotation speed of the motor 22 to keep the rotation speed of the driven pulley 25 at the target speed. As a result, as the metal belt 24 is deviated more toward the tip portion of the drive pulley 23, the rotation speed of the motor 22 becomes lower. The deviation detection processing portion 164 monitors the rotation speed of the motor 22, and when the rotation speed of the motor 22 becomes lower than a predetermined threshold, the deviation detection processing portion 164 determines that the metal belt 24 is deviated.

It is noted that the threshold is set to a value that is lower than the rotation speed of the motor 22 when the metal belt 24 is stretched on the first outer periphery portion 23A, and higher than the rotation speed of the motor 22 when the metal belt 24 is stretched on the tip end portion (a right end portion in FIG. 2) of the drive pulley 23. This allows the deviation detection processing portion 164 to determine that the metal belt 24 is deviated, before the metal belt 24 is deviated to the tip end portion of the drive pulley 23.

In the present embodiment, the second outer periphery portion 23B is formed on the drive pulley 23 on the tip end side (namely, the right in FIG. 4) of the first outer periphery portion 23A. However, as another embodiment, an outer periphery portion of a reversely tapered shape may be formed on the base end side (namely, the left in FIG. 4) of the first outer periphery portion 23A, wherein the diameter of the outer periphery portion becomes large as the position in the axial direction approaches the base end. In addition, an outer periphery portion of a reversely tapered shape may be formed on both sides of the first outer periphery portion 23A.

Figure 6:
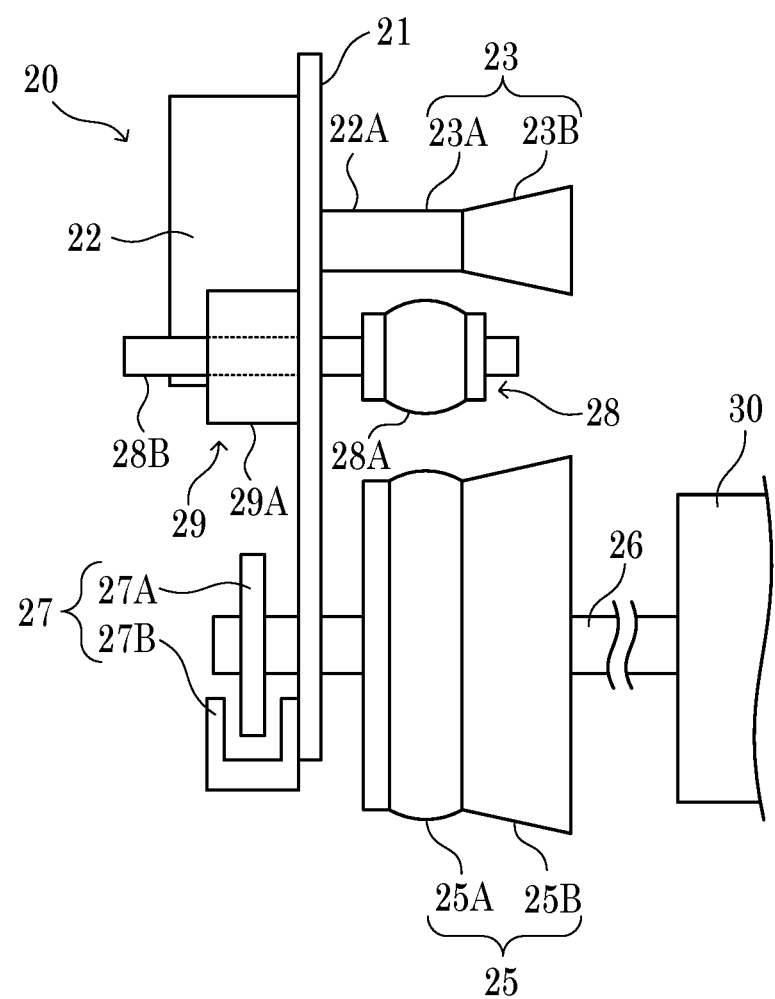
FIG. 6 is a diagram showing an example configuration of the belt drive portion of the image forming apparatus according to the embodiment of the present disclosure.

Furthermore, as another embodiment, an outer periphery portion of a reversely tapered shape may be formed on the driven pulley 25 on one side or both sides of the first bulging portion 25A. For example, as shown in FIG. 6, an outer periphery portion 25B of a reversely tapered shape may be formed on the driven pulley 25 on the driven body 30 side of the first bulging portion 25A. In this case, the more deviated from the first bulging portion 25A of the driven pulley 25 the metal belt 24 is, the larger the diameter of the driven pulley 25 contacting the metal belt 24 is. This reduces the rotation speed of the driven pulley 25. As a result, when this happens, the motor control portion 162 increases the rotation speed of the motor 22 to keep the rotation speed of the driven pulley 25 at the target speed. Accordingly, in this case, when the rotation speed of the motor 22 becomes higher than a predetermined threshold, the deviation detection processing portion 164 determines that the metal belt 24 is deviated.

The return processing portion 165 returns the metal belt 24 to its original position when the deviation detection processing portion 164 detects a deviation of the metal belt 24. Specifically, the return processing portion 165 returns the metal belt 24 to its original position by controlling an inclination adjusting mechanism (not shown) that is configured to adjust an inclination of the drive pulley 23 in the axial direction. In addition, before returning the metal belt 24 to its original position, the return processing portion 165 separates the pressing pulley 28 from the metal belt 24. Specifically, the return processing portion 165 controls the moving mechanism 29 to move the pressing pulley 28 from the third position P3 to the fourth position P4.

It is noted that there are various methods for returning the metal belt 24 to its original position. For example, as another embodiment, the return processing portion 165 may return the metal belt 24 to its original position by reversely rotating the motor 22 (namely, rotating the motor 22 in a direction reverse to the rotation direction of the image formation).

The notification processing portion 166, when the deviation detection processing portion 164 detects a deviation of the metal belt 24, notifies that a deviation of the metal belt 24 has been detected. It is noted that when the deviation detection processing portion 164 detects a deviation of the metal belt 24, the notification processing portion 166 may immediately notify that a deviation of the metal belt 24 has been detected. Alternatively, when the deviation detection processing portion 164 detects a deviation of the metal belt 24, and then the return processing portion 165 fails to return the metal belt 24 to its original position, the notification processing portion 166 may notify that a deviation of the metal belt 24 has been detected.

For example, the notification processing portion 166 may send information that indicates that a deviation of the metal belt 24 has been detected, to a server (not shown) of a company that has undertook the maintenance work of the image forming apparatus 1. Alternatively, the notification processing portion 166 may display, on the operation/display portion 10, a message that urges to perform inspection of the metal belt 24.

[Deviation Detecting Process]

Figure 5:
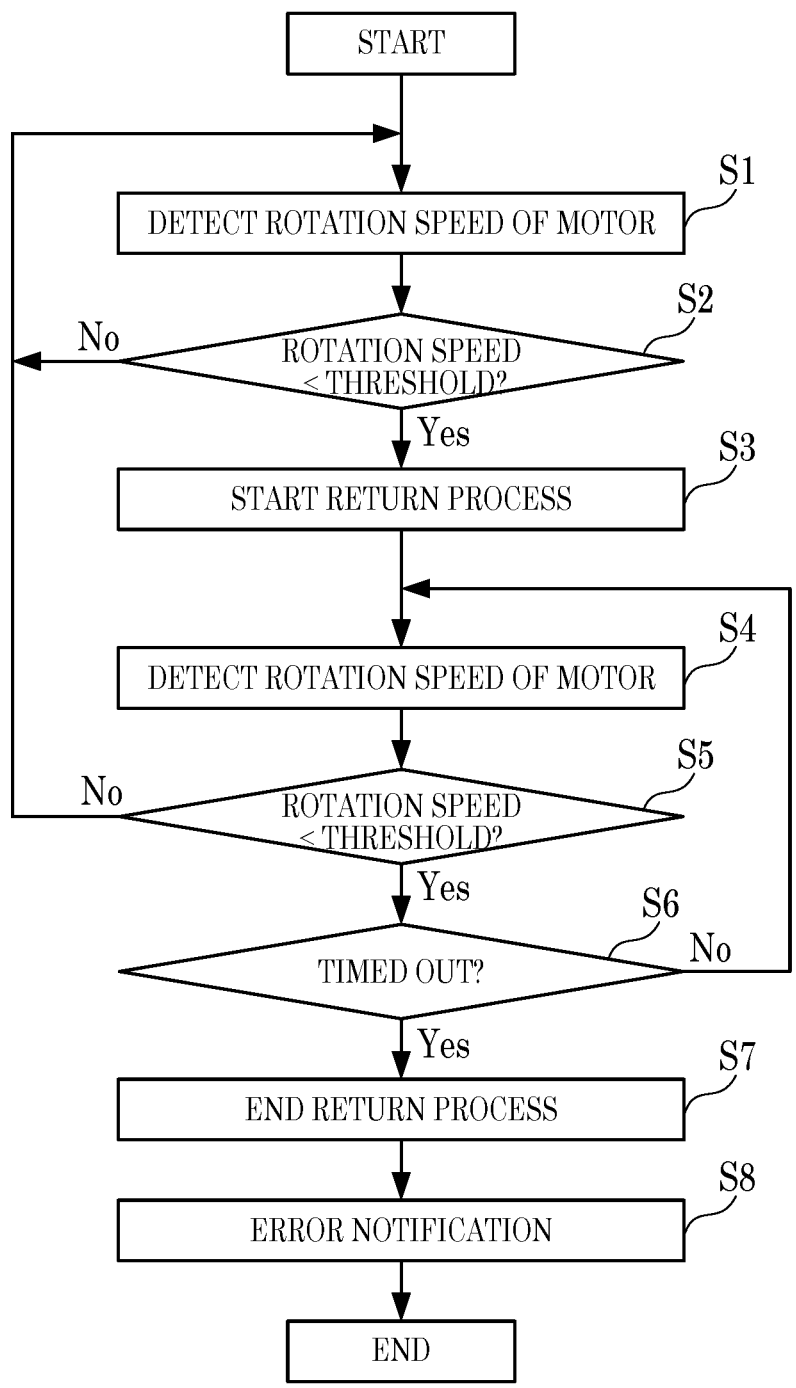
FIG. 5 is a flowchart showing an example of a procedure of a deviation detecting process executed in the image forming apparatus according to the embodiment of the present disclosure.

In the following, with reference to FIG. 5, a description is given of an example of the procedure of a deviation detecting process executed by the control portion 16. Here, steps S1, S2, . . . represent numbers assigned to the processing procedures (steps) executed by the control portion 16. It is noted that, for example, the deviation detecting process is executed in response to a power-on of the image forming apparatus 1.

<Step S1>

First, in step S1, the control portion 16 detects the rotation speed of the motor 22. For example, the control portion 16 detects the rotation speed of the motor 22 based on, for example: a size of current supplied from the motor drive circuit (not shown) to the motor 22; and an output signal from a sensor (for example, a rotary encoder or a hall sensor) that is provided for detection of the rotation speed of the motor 22. The process of step S1 is executed by the motor speed detecting portion 163.

\<Step S2\>

In step S2, the control portion 16 determines whether or not the rotation speed of the motor 22 detected in step S1 is lower than a predetermined threshold. When it is determined that the rotation speed of the motor 22 is lower than the threshold (S2: Yes), the process moves to step S3. On the other hand, when it is determined that the rotation speed of the motor 22 is not lower than the threshold (S2: No), the process returns to step S1. The process of step S2 is executed by the deviation detection processing portion 164.

\<Step S3\>

In step S3, the control portion 16 starts a return process. For example, in the return process, the control portion 16 controls the adjusting mechanism (not shown) in order to return the metal belt 24 to its original position. The process of step S3 is executed by the return processing portion 165.

Here, before returning the metal belt 24 to its original position, the control portion 16 separates the pressing pulley 28 from the metal belt 24. Specifically, the control portion 16 controls the moving mechanism 29 to move the pressing pulley 28 from the third position P3 to the fourth position P4. This prevents the pressing pulley 28 from becoming a hindrance when the metal belt 24 is returned to its original position.

\<Step S4\>

In step S4, the control portion 16 detects the rotation speed of the motor 22. The process of step S4 is executed by the motor speed detecting portion 163.

\<Step S5\>

In step S5, the control portion 16 determines whether or not the rotation speed of the motor 22 detected in step S4 is lower than the threshold. When it is determined that the rotation speed of the motor 22 is lower than the threshold (S5: Yes), the process moves to step S6. On the other hand, when it is determined that the rotation speed of the motor 22 is not lower than the threshold (S5: No), the process returns to step S1. In this case, the control portion 16 controls the moving mechanism 29 to move the pressing pulley 28 from the fourth position P4 to the third position P3.

\<Step S6\>

In step S6, the control portion 16 determines whether or not the return process has timed out. That is, the control portion 16 determines whether or not a predetermined time has passed since the start of the return process in step S3. When it is determined that the return process has timed out (S6: Yes), the process moves to step S7. On the other hand, when it is determined that the return process has not timed out (S6: No), the process returns to step S4.

\<Step S7\>

In step S7, the control portion 16 ends the return process. For example, the control portion 16 stops the motor 22.

\<Step S8\>

In step S8, the control portion 16 performs an error notification. For example, the control portion 16 sends information that indicates that a deviation of the metal belt 24 has been detected, to a server (not shown) of a company that has undertaken the maintenance work of the image forming apparatus 1. This ends the deviation detecting process. The process of step S8 is executed by the notification processing portion 166.

As described above, in the image forming apparatus 1 of the present embodiment, the pressing pulley 28 including the second bulging portion 28A is provided in a state of being in contact with the outer peripheral surface of the metal belt 24. This restricts a plastic deformation of the metal belt 24 by the force received from the first bulging portion 25A, and restricts the metal belt 24 in a state of being curved from coming in contact with the drive pulley 23. As a result, the metal belt 24 is restricted from being damaged.

In addition, in the image forming apparatus 1 of the present embodiment, the return process or the notification process is performed when a deviation of the motor 22 is detected. That is, the return process or the notification process is performed before the metal belt 24 drops off the drive pulley 23 or the driven pulley 25. As a result, it is possible to prevent the image forming portion 13 from suddenly becoming unable to form an image.

In addition, according to the present embodiment, a deviation of the motor 22 is detected based on the rotation speed of the motor 22. As a result, it is possible to detect a deviation of the motor 22 with a simple configuration.

[Modifications]

The driven body 30 is not limited to the photoconductor drum, but may be a developing roller provided in the developing device, or a drive roller for causing a transfer belt provided in the transfer device to move circularly. In particular, for the photoconductor drum, the developing roller, and the transfer belt, a belt drive is more desirable than a gear drive so that reduction of image quality due to vibration generated by gears contacting each other can be avoided.

In the image forming apparatus 1, the metal belt 24 may be replaced with a resin belt.

In the image forming apparatus 1, the metal belt 24 may be stretched among three or more pulleys including the drive pulley 23 and the driven pulley 25. In this case, the first pulley or the second pulley of the present disclosure may be one of the three or more pulleys.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A belt drive device comprising:
a first pulley;
a second pulley;
a first bulging portion formed along an outer periphery of the second pulley to bulge outward in a radial direction of the second pulley at a center of the second pulley in an axial direction of the second pulley;
a belt stretched between the first pulley and the first bulging portion;
a pressing portion configured to press an outer peripheral surface of the belt at a center of the belt in a width direction of the belt; and
a third pulley provided in a state of being in contact with the outer peripheral surface of the belt, wherein
the pressing portion is a second bulging portion formed along an outer periphery of the third pulley to bulge outward in a radial direction of the third pulley at a center of the third pulley in an axial direction thereof, and
a curvature of the second bulging portion in the axial direction of the third pulley is larger than a curvature of the first bulging portion in the axial direction of the second pulley.

2. The belt drive device according to claim 1, wherein
the pressing portion presses the belt at a position that is on a downstream side of a first position in a moving direction of the belt, and is on an upstream side of a second position in the moving direction of the belt, wherein an arbitrary point on the belt starts to be separated from the second pulley at the first position while the belt is moving, and an arbitrary point on the belt starts to contact with the first pulley at the second position while the belt is moving.

3. The belt drive device according to claim 1, further comprising:
a moving mechanism configured to move the pressing portion between a third position and a fourth position, wherein the pressing portion is in contact with the belt when the pressing portion is at the third position, and the pressing portion is separated from the belt when the pressing portion is at the fourth position.

4. An image forming apparatus comprising:
the belt drive device according to claim 1; and
an image forming portion including a driven body driven by the belt drive device, the image forming portion configured to form an image on a sheet.

5. The image forming apparatus according to claim 4, wherein
the driven body includes at least one of a photoconductor drum, a developing roller, and a drive roller that causes a transfer belt to move circularly.

\* \* \* \* \*